United States Patent
Held, Jr.

[15] 3,695,799
[45] Oct. 3, 1972

[54] APPARATUS FOR VACUUM FORMING HOLLOW ARTICLES FROM TWO SHEETS OF THERMOPLASTIC MATERIAL

[72] Inventor: Edward C. Held, Jr., Bartlesville, Okla.

[73] Assignee: Philips Petroleum Company

[22] Filed: July 23, 1970

[21] Appl. No.: 57,490

Related U.S. Application Data

[62] Division of Ser. No. 622,615, March 13, 1967, Pat. No. 3,548,043.

[52] U.S. Cl. .................425/109, 425/388, 425/395, 425/397, 425/292
[51] Int. Cl. ............................................B29c 17/03
[58] Field of Search....18/19 F, 19 H, 19 N, DIG. 13, 18/39, 51, DIG. 60, 62, 30 LM, 5 BH, 5 BZ, 4 R; 264/90, 92; 425/388, 395, 397, 109

[56] References Cited

UNITED STATES PATENTS

| | | | |
|---|---|---|---|
| 3,398,434 | 8/1968 | Alesi, Jr. et al. | 18/19 N X |
| 2,991,600 | 7/1961 | Lancaster | 18/DIG. 60 |
| 3,219,307 | 11/1965 | Leeds et al. | 264/92 |
| 3,105,270 | 10/1963 | Fibish | 18/19 F |
| 2,983,955 | 5/1961 | Gajdosik | 18/19 F X |
| 3,160,340 | 12/1964 | Menkel | 18/19 N X |
| 3,279,004 | 10/1966 | Hartmen et al. | 18/30 LM X |
| 2,482,338 | 9/1949 | Hall | 18/30 LM X |
| 2,918,698 | 12/1959 | Hagen et al. | 264/98 |
| 3,474,497 | 10/1969 | Watts, Jr | 18/19 F |
| 3,486,197 | 12/1969 | Williams et al | 425/109 |
| 2,968,064 | 1/1961 | Howell | 425/388 |
| 1,310,442 | 7/1919 | Roberts | 425/395 X |
| 3,228,066 | 1/1966 | Rippstein | 425/397 X |
| 2,967,328 | 1/1961 | Shelby et al. | 425/388 X |

FOREIGN PATENTS OR APPLICATIONS

| | | | |
|---|---|---|---|
| 379,035 | 1932 | Great Britain | 18/19 H |
| 75,414 | 1932 | Sweden | 18/19 H |

Primary Examiner—Robert D. Baldwin
Assistant Examiner—David S. Safran
Attorney—Young and Quigg

[57] ABSTRACT

Hollow articles are fabricated from two flat sheets by passing said sheets through a heating zone while in a spaced relationship, and thence advancing said sheets forwardly and inwardly into a closer space relationship between two mold halves; said mold halves then being brought together as a vacuum is pulled on each sheet to cause it to conform to the shape of its respective mold. The molds can have means to draw the sheet up to the peripheral edges of the mold so as to minimize scrap. The resulting parts are then severed from the connecting web, such as by shearing with a dull plate. Manifolds are provided in the molds to vent each hollow article when using multicavity molds. In embodiments wherein the sheets are disposed horizontally, the positioning of said sheets relative to said heaters, molds, and the like is adjusted to compensate for the unsymmetrical nature of the heat transfer and sagging. The sheets can be fed from floating rolls to aid in alignment. The entire molding cycle is operated on a combination of time and sequence control so as to eliminate wasted time and allow greater flexibility in adjusting process conditions.

7 Claims, 7 Drawing Figures

INVENTOR.
EDWARD C. HELD, JR.

PATENTED OCT 3 1972

INVENTOR.
EDWARD C. HELD, JR.
BY
*Young + Luigy*

ATTORNEYS

INVENTOR.
EDWARD C. HELD, JR.

APPARATUS FOR VACUUM FORMING HOLLOW ARTICLES FROM TWO SHEETS OF THERMOPLASTIC MATERIAL

This is a division of copending application Ser. No. 622,615, filed Mar. 13, 1967, now U.S. Pat. No. 3,548,043.

This invention relates to improvements in the apparatus for forming hollow articles from two sheets of thermoplastic material.

The fabrication of hollow articles from thermoplastic materials has taken on significant commercial importance in recent years due to the availability of resins particularly suited for bottles and the like such as linear polyethylene, polypropylene, clear poly(vinyl chloride), and the like.

Current commercial production of such hollow articles is largely by blow molding techniques wherein a tubular extrudate is positioned within a mold and fluid under high pressure is introduced into this tubular extrudate to force it to conform to the shape of the mold. It has been known for years that a potentially more economical way to form such hollow articles was to position two heated sheets of thermoplastic material in parallel relationship between split mold halves and draw each sheet into contact with its corresponding mold half while closing said mold halves to effect fusion of the two sheets around the edges of the mold cavity. One of the basic patents in this field is Held, U.S. Pat. No. 3,099,043, issued July 30, 1963. While this technique is used commercially for certain select items, it has not yet achieved wide scale commercial success.

For one thing the sheets must be spaced relatively close together at the time they contact the mold to minimize the draw on the sheets as the molds close; yet the sheets must be spaced relatively far apart during the heating operation in order to provide proper heating. This is a less severe problem with continuous operations such as is shown in U.S. Pat. No. 3,099,043 since the traveling molds can contact the sheets in the heating zone and carry them inwardly as the molds approach the forming zone. However, because of the extremely large output of product which a continuous machine is capable of, and because of the expense of constructing a continuous machine, many smaller fabricators would prefer to use an intermittent motion machine. With an intermittent motion machine, however, a conveyor means must be provided separate from the molds to convey the sheet through the entire operation. This makes it difficult to provide for a widely spaced relationship of the sheets during the heating operation and a closely spaced relationship at the time of contact with the molds. This is because to provide for moving the sheets in a direction perpendicular to the direction of travel requires sprockets on both sides of the conveyor chain which interferes with the mechanism which grips the sheet.

Furthermore, with intermittent motion machines of the prior art there are the related problems of excessive scrap production and thinning out of the sheet near the edges of the mold cavities. This is because the sheet must be held firmly along its side edges by the conveyer mechanism; as the molds come together they tend to stretch the plastic in the area on each side of the peripheral edges of the mold cavity; this results in thinning of the part in the areas corresponding to the part of the sheet within the mold cavity which is stretched, and of course this also results in waste of all the material between the conveyer mechanism and the edge of the mold cavity. With conventional vacuum forming of single sheets there is generally from 15 to 75 percent scrap; it is manifest that there is an even greater tendency to form scrap in the formation of hollow articles from two sheets of material. Also where multiple cavity molds are used there is additional scrap between the individual moldings. It is apparent that there is a lower percentage of scrap utilizing multiple cavity molds but their use has been limited by the apparent necessity to connect each cavity directly to the atmosphere or to the source of fluid pressure.

An additional problem encountered in the intermittent formation of hollow articles from two sheets of material relates to the platens which hold the mold. In order for the platens to be sufficiently rigid to give positive contact of the two sheets of plastic around the entire outer edge of each mold cavity the platens have had to be excessively thick and heavy; this is an especially severe problem when large molds or multiple cavity molds taking up a large area are used. Also there has been a need to provide a platen which is easily adjustable to accommodate different size molds. A further shortcoming with intermittent motion forming machines lies in the difficulty in operating the various steps in the desired sequence. If timers are relied upon, time is wasted while the timers are resetting. If rotating cams are used, the operation is somewhat inflexible since a new cam must be installed to change a particular sequence. As a matter of economics, lost time cannot be tolerated. Also inherent in such a complex plastics fabrication operation as the production of hollow articles from flat sheets of starting material, is the need for close control over the conditions in each step and great flexibility to allow adjusting conditions to accommodate changes in the characteristics of the sheet material and the like.

Not all problems which have slowed the commercialization of this uniquely desirable fabricating technique are peculiar to intermittent operations. There has been a need for better cooling, both with regard to the part itself and to the connecting sheet area around the peripheral edges of each part which is always the thickest since it is drawn less, if at all, and thus is the slowest to cool. Also it has been found that the sheet is frequently not wound onto the feed rolls evenly; since these processes can use relatively heavy sheet which is difficult to roll evenly, or which shifts on the roll during handling, it is not necessarily possible to solve this problem by improving the techniques in rolling the sheet onto the rolls.

Finally, the preferred method of carrying out the formation of hollow articles from two sheets of plastic, whether on an intermittent or continuous basis, is to convey the sheets in a horizontal, as opposed to vertical, arrangement. This creates numerous difficulties with uneven heat transfer, sagging, and the resulting uneven wall thickness of the finished parts.

It is an object of this invention to provide an apparatus for fabricating high quality hollow articles from two flat sheets at commercially acceptable rates with a low production of scrap.

It is another object of this invention to provide an intermittent motion apparatus for fabricating hollow articles from two flat sheets wherein the sheets are spaced apart during the heating cycle the optimum distance for uniform heating and yet are brought together in a more closely spaced arrangement prior to contact with the molds so as to minimize scrap formation.

It is another object of this invention to provide an intermittent motion apparatus for fabricating hollow articles from two flat sheets, having a manifold arrangement for venting each hollow article so as to allow expansion of the multiple cavity concept to include the fabrication of three or more rows of articles side by side.

It is another object of this invention to provide an intermittent motion apparatus for fabricating hollow articles from two flat sheets, having a light weight adjustable platen which is sufficiently rigid to allow uniform positive contact between the opposing mold surfaces which pinch together the two sheets.

It is another object of this invention to provide an intermittent motion apparatus for fabricating hollow articles from two flat sheets, having a combination of time and sequence control of the various steps so as to eliminate wasted time and to allow great flexibility in adjusting and changing the process conditions.

It is a further object of this invention to provide an apparatus for fabricating hollow articles from two flat sheets in which the part and the surrounding connecting web are cooled quickly and evenly.

It is a further object of this invention to provide an apparatus for fabricating hollow articles from two horizontally disposed flat sheets fed from roll stock wherein unevenly rolled sheet can be accommodated.

It is a further object of this invention to provide an apparatus for fabricating hollow articles from two horizontally disposed flat sheets wherein uneven polymer distribution in the resulting part, which is the result of unsymmetrical heat distribution and sagging, is eliminated.

It is a still further object of this invention to provide a simple and effective method for trimming the connecting and surrounding web from the parts.

In accordance with this invention hollow articles are fabricated from two flat sheets by passing said sheets through a heating zone or zones while in a widely spaced relationship, and thence advancing said sheets forwardly and inwardly into a closer spaced relationship between two mold halves; said mold halves then being brought together as a vacuum is pulled on each sheet to cause it to conform to the shape of its respective mold. The resulting parts are then severed from the connecting web.

In the drawings, forming a part hereof, in which like reference characters denote like parts in all views.

Figure 1:
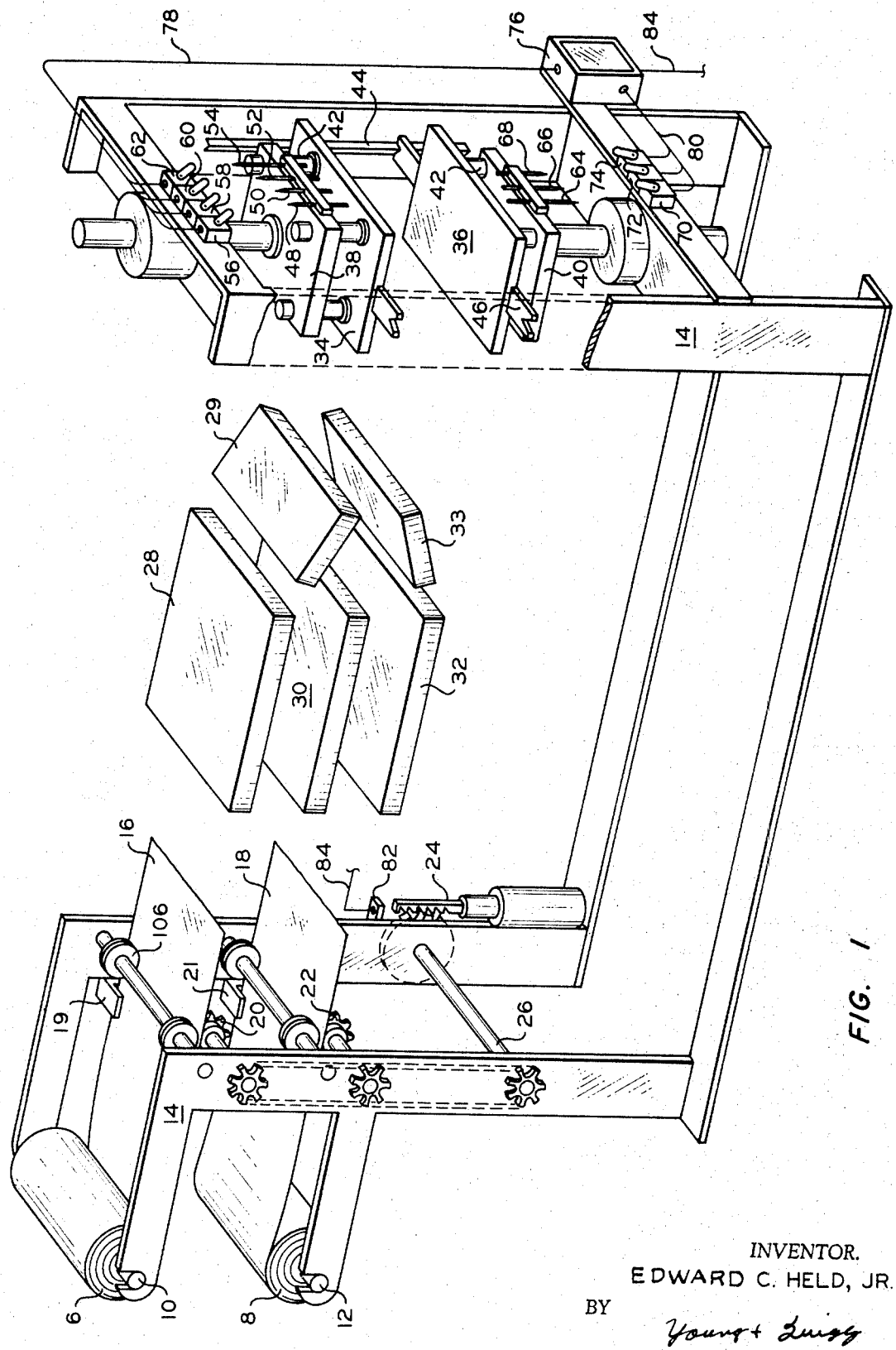
FIG. 1 is a dimetric view of a preferred embodiment of the apparatus for forming hollow articles in simplified form.

Referring now in particular to FIG. 1, there is shown rolls of plastic sheet 6 and 8 on supporting bars 10 and 12 respectively, said shafts carried by frame 14. The rolls of sheet are free to "float" on said bars, the sheets being aligned by sheet guides 19 and 21 and similar guides, not shown, on the other sides. Upper sheet 16 and lower sheet 18 are advanced by conveyor chains driven by upper and lower drive sprockets 20 and 22. These drive sprockets are actuated by the downward movement of rack gear 24 which drives output shaft 26 which in turn is operably connected to drive sprockets 20 and 22 and identical sprockets on the other side. Upper sheet 16 then passes between upper heater 28 having a forward section 29 and center heater 30. Lower sheet 18 then passes between center heater 30 and lower heater 32 which has a forward section 33. Heaters 28, 29, 30, 32, and 33 are carried by frame 14 by means not shown. Heaters 28, 29, 30, 32, and 33 thus form heating zones for the two sheets. The heated sheets then are advanced to a position between upper platen 34 and lower platen 36. Platens 34 and 36 are mounted to subplatens 38 and 40 respectively by means of adjustable legs 42. The subplatens are smaller in surface area than the platens; the legs are evenly spaced around the periphery of the subplatens, generally being at the corners in the case of a square subplaten. The subplatens are reciprocally carried by frame 14. Cooperating with alignment bracket 46 is V-shaped guide 44 which provides exact alignment of the opposing platens. Adjustable rods 48, 50, 52, and 54 carried by subplaten 38 engage limit switches 56, 58, 60, and 62 respectively on the upward movement of platen 34. Adjustable rods 64, 66, and 68 carried by subplaten 40 engage limit switches 70, 72, and 74. The limit switches are connected with timer 76 via conduits 78 and 80. Rack 24 engages limit switch 82 which is connected with timer 76 via conduit 84.

Figure 2:
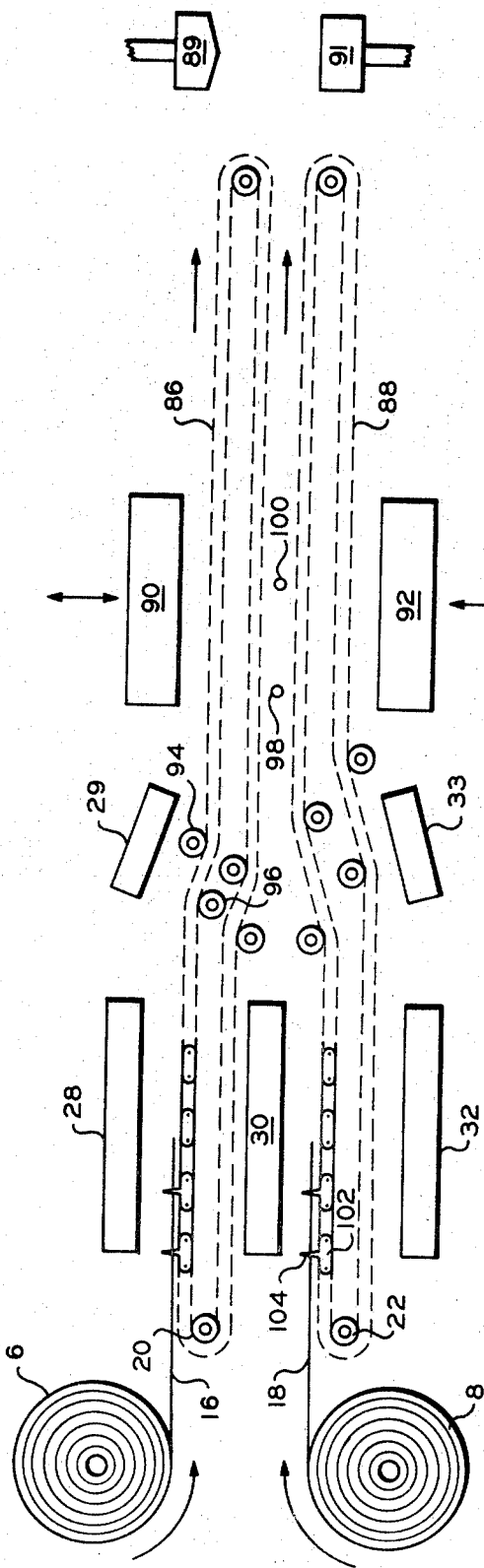
FIG. 2 is a cross section of the apparatus of FIG. 1, again in simplified form.

Referring now particularly to FIG. 2, the sheets are advanced by a sheet advance means comprising an upper chain conveyer 86 and a lower chain conveyer 88. As the chains advance the sheets into the area between the mold halves 90 and 92 they converge. This necessitates the use of sprockets on both sides of each chain section as shown, for instance, by sprockets 94 and 96. Mold halves 90 and 92 are mounted to platens 34 and 36 respectively by means not shown. Blow pins 98 and 100 are carried by frame 14 by means not shown. The chain conveyers are so positioned relative to the heaters and the molds that the upper sheet is held closer to the upper heater than it is to the center heater, and the lower sheet is held closer to the center heater than it is to the lower heater. Furthermore, while the molds are so mounted and adjusted as to come together in such a way that the blow pins are on the center line of the two mold halves, the chain conveyors are not mounted symmetrically above and below the blow pins. Rather the upper conveyer carries the upper sheet above the blow pins a distance which is greater than the distance the lower conveyer carries the lower sheet below the blow pins. A trimming means comprises upper shearing member having tapered shearing plates 89 and matching shearing die 91.

Figure 3:
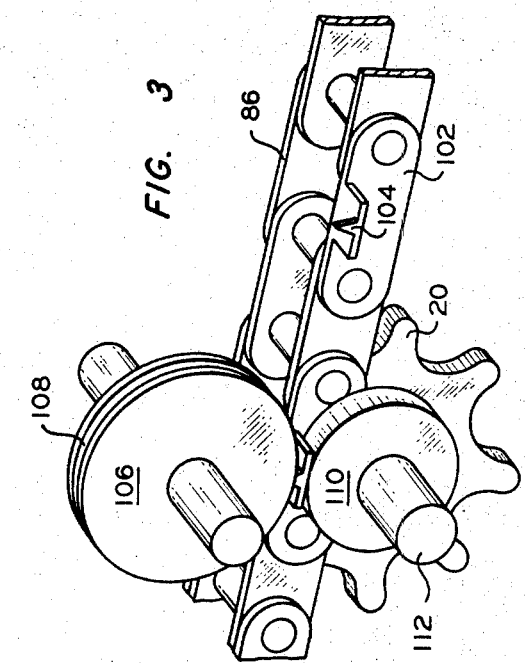
FIG. 3 is a dimetric view in detail of a portion of the sheet conveyer of FIG. 2.

FIG. 3 is best viewed in conjunction with FIGS. 1 and 2. Here is shown a section of upper chain conveyer 86.

Roller link plate 102 has an outwardly and upwardly projecting piercing element 104. Piercing wheel 106 has a slot 108. The edge of the sheet (not shown) is engaged by the piercing element 104 as it passes between piercing element 104 and piercing wheel 106. Back-up wheel 110 carried by shaft 112 supports the under surface of piercing element 104 as it is forced through the sheet. Mounted on shaft 112 is drive sprocket 20; this sprocket engages conveyer chain 86. It is essential that the sheet not extend laterally past the roller link plates since sprockets must engage the conveyer chains on both sides. That is, the outwardly and upwardly projecting piercing element 104 engages the very edge of the sheet and makes possible conveying the sheet in both horizontal and vertical directions.

Figure 4:
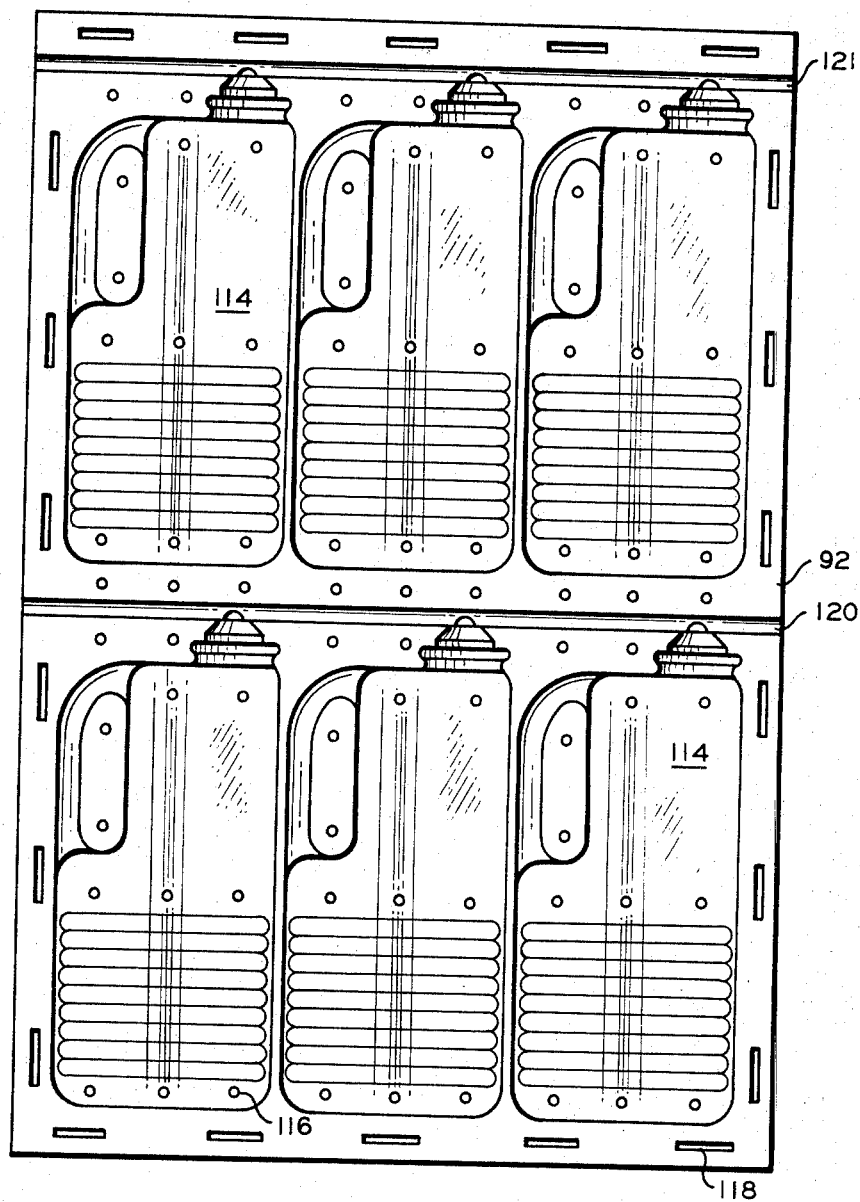
FIG. 4 is a plan view of the multicavity mold of FIGS. 1 and 2.

Referring now in particular to FIG. 4 mold half 92 is shown having multiple cavities 114. Vacuum ports 116 allow evacuating the air from between the sheet and the mold so as to cause the sheet to conform to the shape of the mold. Vacuum ports 116 are also positioned in the area between the parts. This allows the flat sheet in these areas to be pulled down against the mold surface; since this sheet area is the thickest and hence the slowest to cool, it is most essential that it come into intimate contact with the mold so as to facilitate heat transfer. All around the peripheral edges of the mold are vacuum ports in the form of slots 118. When the mold first contacts the molten sheet these vacuum slots draw the sheet up into intimate contact with these peripheral edges; thus as the mold halves continue to close all stretching of the sheet occurs between the peripheral edges of the mold and the point where the edge of the sheet is clamped to the conveyer chain. Manifolds 120 and 121 provide means for maintaining communication with the outside either by venting to the atmosphere or by providing positive blow pressure via blow pins 98 and 100 to individual molds in multicavity molds where each individual mold is not directly vented to the outside.

Figure 5:
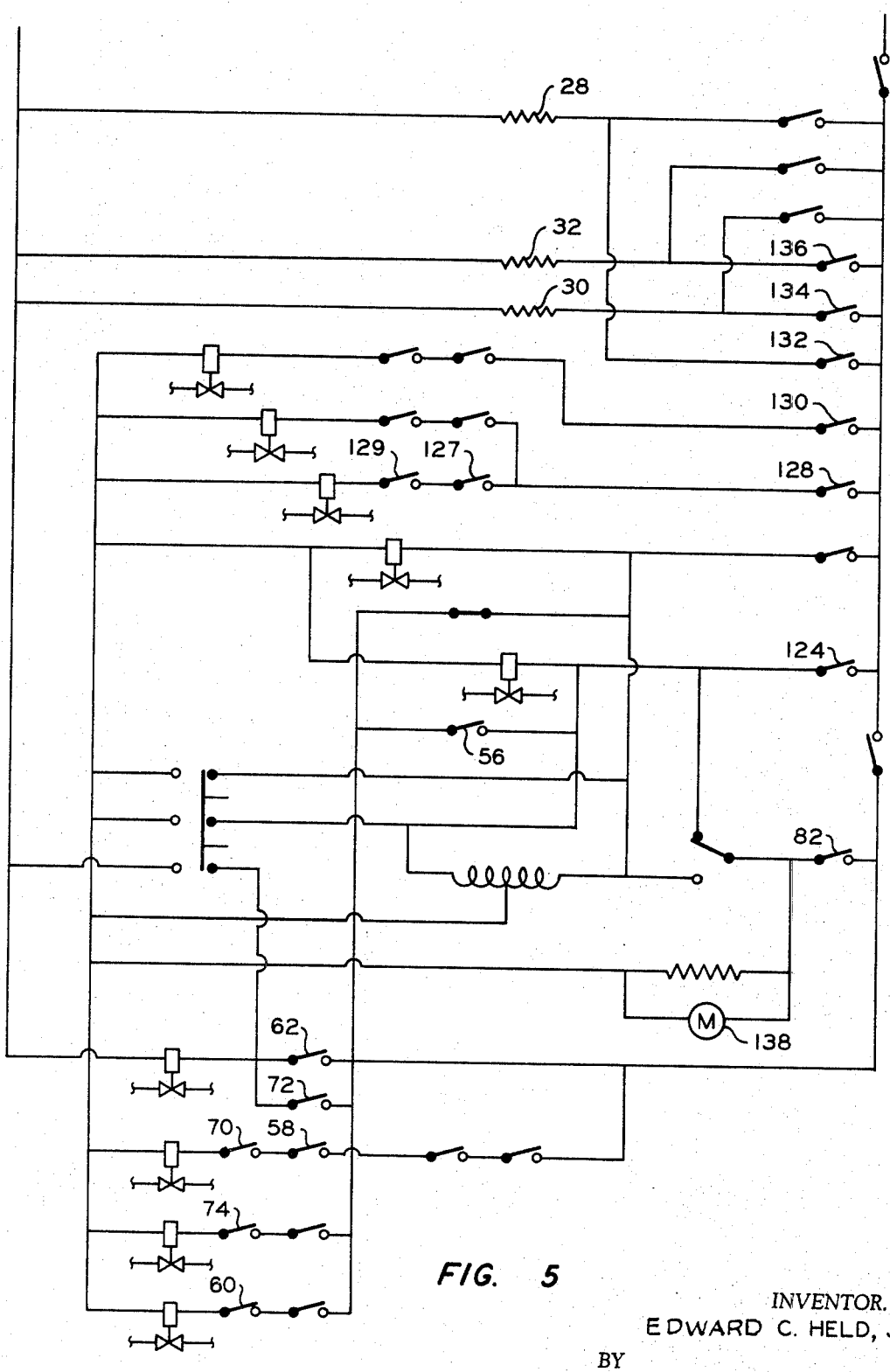
FIG. 5 is a wiring diagram of the time and sequence control mechanism of FIG. 1.

FIG. 5 shows a simplified wiring diagram of the apparatus. As rack 24 moves down (FIG. 1) the sheets are advanced and adjustable limit switch 82 is closed; this starts the timer comprising contact points 124, 128, 130, 132, 134, and 136, and motor 138 which opens and closes said points. Contact point 124 closes; this then becomes the holding circuit to operate the timer motor after switch 82 is reopened; also this activates the closing mechanism for the top platen. Movement of this top platen closes limit switch 56 which activates the closing mechanism for the bottom platen; therefore, the mechanism or means for closing the bottom platen is activated after the top platen has moved down a prescribed distance and closed limit switch 56. The movement of mold halves 90 and 92 is timed so that the mold halves will touch sheets 16 and 18 just as the sheets are advanced to the proper position between the mold halves. Just before the mold halves touch the sheets, contact point 128 closes which activates the mechanism which pulls a vacuum through ports 116 and slots 118. An initial lower vacuum can be provided by adjusting rods 50 and 64 so as to first close limit switches 58 and 70 which activate a mechanism or means which draws a low initial vacuum. As the molds close, contact point 130 closes which activates the mechanism which forces fluid pressure into the part through blow holes 98 and 100. Contact points 132, 134, and 136 which on closing activate the top, center, and bottom heaters, respectively are closed by the timer at the appropriate time during the cycle depending on the gauge of the sheet, the melting point of the sheet, the temperature of the room, and other factors. At this time, the sheet advance rack 24 recocks. After a set time, the timer opens contact point 124 which opens contact points 128, 130, 132, 134, and 136 if they have not been set to open prior to this time. This activates the means for opening the mold. When the mold has opened a predetermined amount, limit switches 62 and 72 are closed and this activates the sheet advance mechanism. Limit switches 60 and 74 are also closed by the opening movement of the mold; these switches activate a mechanism or means which causes air to be passed into the mold halves through ports 116 to eject the part which has been formed. As the sheet advance mechanism begins to operate, rack 24 again closes limit switch 82 and the cycle is repeated.

Figure 6:
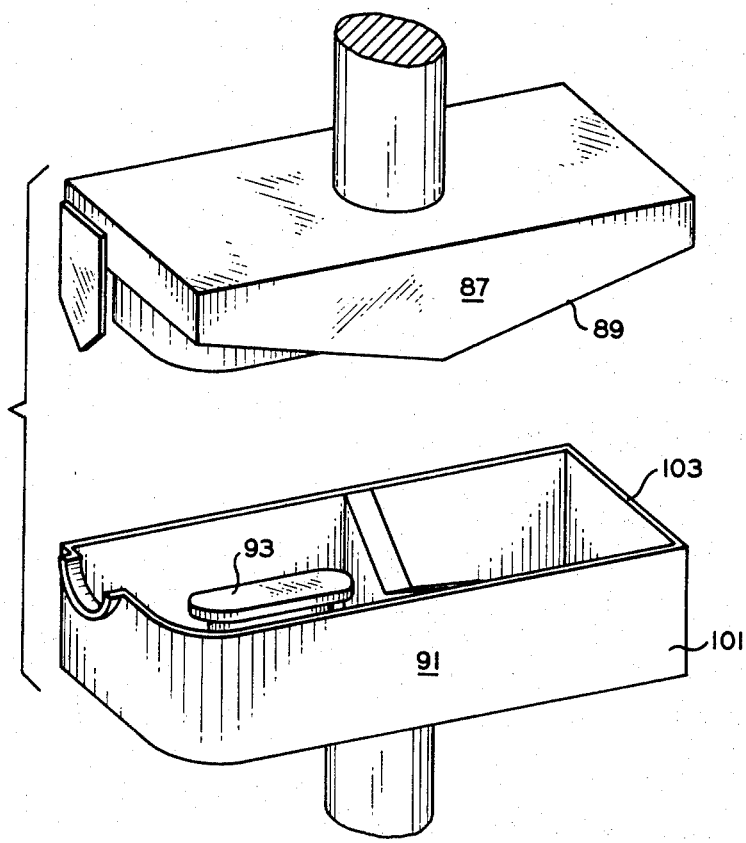
FIG. 6 is a dimetric view of the trimming means in simplified form.
Figure 7:
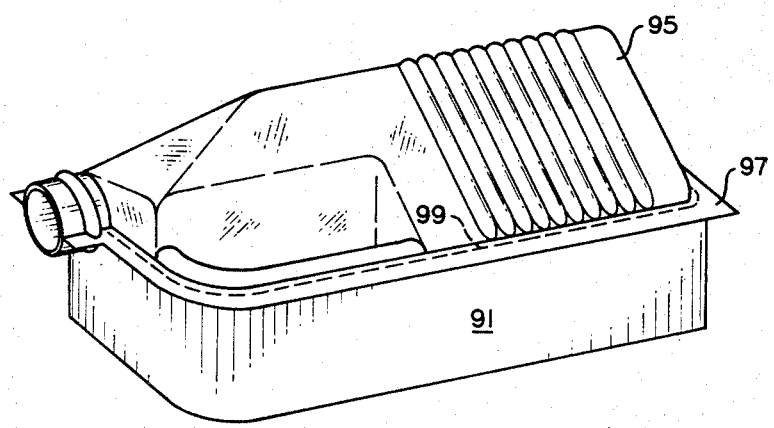
FIG. 7 is a dimetric view of the die portion of the trimming means with a bottle in place.

Referring now to FIGS. 6 and 7, there is shown a dimetric view of the trimming means in simplified form. This trimming means comprises a lower shearing die 91 and an upper shearing member 87 having a plurality of tapered shearing plates 89. Lower die 91 supports the molded article, the peripheral edges 103 substantially corresponding to the shape of the article where the mold halves come together. Die part 93 cooperates with a shearing member (not shown) attached to shearing member 87 to trim the web within the handle area.

As shown by FIG. 7, the hollow molded article 95 is integrally attached to web 97 which is formed by the fusion of the upper and lower sheets. This hollow article is positioned in lower die 91. The upper trimming member is moved downward by means not shown and tapered shearing plates 89 pierce web 97 along a score line 99 formed by the mold halves in pinching the two sheets together. As the trimming member continues its downward motion the tear is propagated along the edge of tapered shearing plate 89 until the entire hollow article is separated from the web. It is to be noted that this trimming operation works the principle of creating a point of stress concentration between the shearing plates and the shearing die along the score line of the web. As plate 89 moves down along the outer walls 101 of die 91 this point of stress concentration moves along with the leading edge of the shearing plates thus propagating the tear around the entire periphery of the article. Thus the shearing plates do not have to be sharp, but rather can have a dull edge. The tapered shearing plates 89 are contoured so as to fit over said outer wall 91 with a comparatively close tolerance so as to further facilitate the concentration of stress. While it is possible to have metal to metal contact, in the preferred embodiment there is no metal to metal contact which would cause wear of the dies. While FIGS. 6 and 7 show only one set of trimming plates and dies, in the preferred embodiments a plurality of identical units are utilized to trim the web from a plurality of articles simultaneously.

The drawings do not include conventional equipment such as temperature controllers, conduits, and the like but these are understood by those skilled in the art and are within the scope of the invention.

The use of sheet guides to align sheet being fed off of rolls which are free to "float" (that is are free to slide laterally) on the bars carrying the rolls makes possible accurate alignment of the sheet. It has been found that with the relatively heavy gauge sheet required for this operation it is difficult to roll the sheet up evenly enough to allow the sheet to be fed off of a roll that is fixed so as not to be movable laterally.

In order to successfully fabricate hollow articles from two sheets it is necessary that the two opposing mold halves align perfectly so that the corresponding parts of the mold halves which define the peripheral edges of the part come together to form the trim line around each part. It is apparent that with large molds or multicavity molds even a slight rotation of one mold half relative to the other would result in the corresponding parts of the two mold halves near the edges being out of alignment. For this reason an alignment bracket is provided on each platen to cooperate with a guide on the frame. This bracket may be a simple notched member as shown in the drawing or preferably it may have rollers which contact the sides of the V-shaped guide affixed to the frame. These rollers may be adjustable in order to make the corrections necessary to achieve a perfect alignment.

Furthermore, not only must the corresponding mold halves be in perfect alignment, but also they must make contact evenly over the entire surface. To provide a platen to carry a large multiple cavity mold which is rigid enough to provide this even pressure over the entire surface would necessitate the use of a platen of considerable thickness and hence one which was undesirably heavy. This problem is circumvented by the use of a subplaten which is connected to the main platen through a four point adjustable suspension. Not only does this allow the use of a lighter platen by distributing the load over the entire platen, but also it makes possible adjustment of the platen to achieve even pressure over the entire surface and also allows adjustment to accommodate mold halves of varying thickness.

A back-up wheel has been shown in the drawings which supports the underside of the piercing element as it pierces the sheet. Instead of a wheel, a flat support can be provided over which these piercing elements slide. Or, if sprockets or other supports are provided in this area as shown in the drawings, the back-up member can be eliminated.

The vacuum slots around the peripheral edges of each mold half enable these mold halves to draw the sheets tightly against these peripheral edges so that slippage of the sheet relative to these edges as the mold halves continue to close is reduced or eliminated. That is, without these vacuum slots the sheet can slip relative to the peripheral edges of the mold as the mold continues to close and thus the portion of the sheet within the mold is stretched as well as the portion outside the mold; it is manifest that this is undesirable in that it results in greater scrap production and in that it results in a thinning of the sheet within the mold. This also causes an uneven wall thickness in the finished part. It should be noted at this point that by converging the sheets in the area of the mold and by utilizing the vacuum slots to draw the sheet up tightly against the peripheral edges of the mold parts, scrap production is held to a bare minimum. For instance, scrap production utilizing the features of the instant invention is as little as 10 per cent and normally no more than 40 per cent which is comparable to the scrap production in the must less complex conventional thermoforming of open articles from single sheets. Also because the sheet is pulled against the mold quickly it is possible to fabricate flat hollow items where the walls are as little as one-sixteenth -inch apart.

The combination of time and sequence control referred to in the description of FIG. 5 is of particular advantage for two reasons. First, it offers an advantage over the use of a timer for all of the operation since there is no time lost while the timer is resetting. Most important however is that it allows great flexibility. By a simple adjustment of the bars which activate the limit switches or the stops in the timer the operation can be quickly and easily corrected for changes in the gauge of the sheet and other factors that may vary during the course of operation. This offers a clear advantage over the use of cams since it is more difficult to change the adjustment if a new cam must be installed. Furthermore, many of the movements of the apparatus can be controlled by either a time or a sequence control. For instance, the mechanism which pulls the vacuum can be activated by either the timer as shown in the description of FIG. 5 or by limit switch designated 127 which can be activated by movement of the top platen or by limit switch designated 129 which can be activated by movement of the bottom platen. These two limit switches are not shown in FIG. 1. Similarly, other of the unnumbered limit switches shown in FIG. 5 can be used to control movements now controlled by the timer and conversely some of the movements controlled by the limit switches could be controlled by the timer. While limit switches have been shown as being engaged by rods, any suitable means of engaging the limit switches can be used.

It is of particular importance with a horizontal mounting that the chain conveyers are so positioned relative to the heaters that the upper sheet is held closer to the upper heater than it is to the center heater and the lower sheet is held closer to the center heater than it is to the lower heater. This compensates for the tendency of heat to rise and for the heated sheet to sag. By utilizing this arrangement of advancing each sheet through its heating zone along a plane above the midpoint of that heating zone more even heating of the sheet on both sides is achieved with a resultant improvement in the quality of the finished part. Alternatively, the heaters can be spaced the same distance above as below the sheets and the proper heat obtained by varying the size or rate of heating of the heaters. It is apparent that the outer heaters would be spaced symmetrically on each side of the sheet in an arrangement where the sheets were passed through the heating zone in a vertical plane, but it is preferred to operate in a horizontal plane to avoid sheet sag and stretching problems encountered using large molding areas in the vertical, and compensate for the heat rise through the spacing of the heaters.

Another area in which proper spacing of the sheets is essential to achieve the optimum in product quality is in the positioning of the molten sheets between the mold halves. While it would not be apparent that this would be necessary, surprisingly it has been found that with a horizontal mounting it is beneficial to carry the sheets so that the blow pins (and thus the center line or closing line of the mold) are positioned as nearly as possible midway between the average level of the sagged sheets, not in midway between the supported edges. That is, the heated sheets will sag when the operation is carried out in a horizontal plane (which is the preferred arrangement) due to the pull of gravity. In order to compensate for this the mold closes along a line which is as nearly as possible half way between the sagged sheets not half way between the supported edges. This means that the means for advancing the top sheet must support the edges of said top sheet above the parting line of the mold halves a distance which is greater than the distance the means for advancing the bottom sheet supports the edges of said bottom sheet below said parting line. This results in each sheet being carried substantially the same distance after contact with the mold as they are being brought together. If the mold halves come together midway between the supported edges, the lower mold half contacts the lower sheet first and thus carries it further before the mold halves come together than the upper mold half carries the upper sheet; this results in uneven wall thickness in the finished part. This uneven wall thickness is especially pronounced if vacuum ports are not utilized around the peripheral edges of each mold half. By positioning the sheets and blow pins such that the mold parting line is midway between the average height of the sagged sheets, parts of exceptional uniformity in wall thickness are obtained.

It has been found that separate temperature control of the top mold is desirable; otherwise, the top mold tends to get hotter and an inferior product results. The molds of course can be cooled by any conventional manner. For instance, cooling channels can be provided through which water is circulated.

If desired, in order to speed cooling of the parts being fabricated, a cooling medium such as carbon dioxide or a water spray can be introduced through the blow pins.

The multicavity molds can be built up of individual castings. This makes possible an easy interchange of mold parts while at the same time maintaining a minimum distance between the parts so as to provide a minimum of scrap.

The apparatus of this invention can be utilized to fabricate all types of hollow articles such as bottles, hollow toys and other hollow moldings, and hollow flat items such as double wall automobile sun visors, decorative panels, light panels and the like.

Any thermoplastic material which will fusion weld to itself after heating can be used in the practice of this invention. Particularly suitable for instance are polymers and copolymers of ethylene, propylene, and 1-butene.

The residence time in the heating zone or zones can vary widely depending on the gauge and softening point of the thermoplastic sheet. It must only be sufficient to allow the thermoplastic to soften sufficiently to be susceptible to being vacuum formed.

The sequence of operation with regard to the closing of the mold halves is preferably as follows. Each mold half contacts its respective sheet around the peripheral edges of said mold half. Sufficient pressure differential is applied so that when the mold halves have advanced toward each other the full amount, thus sealing the two sheets together around the peripheral edges of the mold, each sheet is pulled out toward the face or forming surface of its respective mold a sufficient amount to prevent the sheets from contacting at any point except along the peripheral edges. The sheets are not at this point drawn up into general contact with the mold face or forming surface. After the mold halves have come together and sealed the sheets together along the peripheral edges, the sheets are then expanded on out into intimate contact with the mold face or forming surface by the continued action of the pressure differential. This sequence of steps allows contact of the two sheets as quickly as possible after initial contact with the peripheral edges of the mold before significant cooling has occurred. This is essential in order to have the sheet sufficiently molten to form a good seal. As shown by the example which utilized this sequence, the seal was such that when failures occurred they occurred at points other than the area where the two sheets were sealed together. Not only is a superior quality seal effected using this sequence of steps, but because the sheet in the area to be sealed has not been stretched out, greater flow of the polymer occurs as the two sheets are pressed together thus forming a smooth seal with no flange. When using thicker sheet or when forming articles other than containers where the seal is not critical it is possible to operate without regard to this exact sequence of steps.

In order to simplify the discussion, the sealing together of the sheets has been described as occurring around the peripheral edges.

This sealing occurs where corresponding parts of the mold halves cooperate to join the two sheets together. It is apparent that this sealing can occur in areas other than the peripheral areas. For instance, as shown by FIG. 4 it can occur in a central area to pinch out a handle when forming a bottle. Also it can occur at other points in the molding to form pillars between opposing walls of the part in a manner similar to that well known in the blow molding art, and it can occur around each part in a multicavity mold. Conversely, the sealing does not necessarily occur around the entire periphery. As shown by FIG. 4, there is a small area communicating with the part of the mold which is to form the mouth of the bottle which is open to the outside.

While the mold has been described in terms of mold halves, the mold, of course, can comprise more than two parts.

EXAMPLE

Two 33 mil thick sheets of ethylene homopolymer having a density of 0.96 (ASTM D 1505-63T) and a melt index of 0.1 (ASTM D 1238-62T, Condition E) were fed into the heating section of an apparatus such as is described in FIGS. 1-7. The upper sheet was 3.75 inches below the upper heater and 4.5 inches above the center heater. The lower sheet was 4.0 inches below the center heater and 5.0 inches above the lower heater. After the sheets had been in the heating zones long enough to soften, they were conveyed by chain conveyers having outwardly and upwardly projecting piercing elements, forward and inward into a closely spaced relationship between two mold halves designed to produce six one-half-gallon milk bottles. The mold halves were brought together and simultaneously a vacuum pulled on each mold half. Shortly after the molds closed, internal air pressure was introduced through the blow pins and internal vent tubes positioned into the plastic. After the bottles had cooled sufficiently to be self-supporting the molds were vented, opened, the parts ejected from the mold and separated from the connecting sheets. Each bottle weighed approximately 45 grams. The total cycle time was 12 seconds for the production of six one-half-gallon bottles. The ratio of scrap to total polymer used was 0.4 to 1. These bottles were filled with water and dropped from progressively increasing heights. At a height of 4 feet no failures occurred. At greater heights where failure did occur it occurred at places other than the weld line of the two sheets.

This example shows that hollow articles can be fabricated from two flat sheets at high rates with low scrap production to give a product with excellent physical properties.

While this invention has been described in detail for the purpose of illustration, it is not to be construed as limited thereby but is intended to include all changes and modifications within the spirit and scope thereof.

I claim:

1. Apparatus for producing at least one hollow article from thermo-plastic material comprising in combination:
   a heating means;
   two mold halves;
   a first conveyor chain having roller link plates with outwardly and upwardly projecting piercing elements extending from said roller link plates;
   a first piercing wheel having a slot therein;
   a first backup means, said first piercing wheel and first backup means being so disposed that said piercing elements of said first chain pass between said first piercing wheel and said first backup means;
   first and second sprocket means disposed one above and one below said first chain so as to engage said first chain on both sides so as to cause said first chain to move forward and inward into position between said mold halves;
   a second conveyor chain having roller link plates with outwardly and upwardly projecting piercing elements extending from said roller link plates;
   a second piercing wheel having a slot therein;
   a second backup means, said second piercing wheel and second backup means being so disposed that said piercing elements of said second chain pass between said second piercing wheel and said second backup means;
   third and fourth sprocket means disposed one above and one below said chain so as to engage said second chain on both sides so as to cause said second chain to move forward and inward into position between said mold halves;
   means for closing and opening said mold halves; and
   means for exhausting air from between each sheet and its corresponding mold half.

2. Apparatus according to claim 1, wherein said mold halves have vacuum ports around their peripheral edges.

3. Apparatus according to claim 1 comprising in addition: supporting bars carried by said frame to support in a floating arrangement rolls of said sheet; and sheet guides carried by said frame to align said sheet into engagement with said advancing means.

4. Apparatus according to claim 1 comprising in addition a first platen attached to said first mold half; a second platen attached to said second mold half; a first subplaten, said first subplaten being smaller in surface area than said first platen and being attached to said first platen by means of at least four legs spaced around the periphery of said subplaten; a second subplaten being smaller in surface area than said second platen and being attached to said second platen by means of at least four legs spaced around the periphery of said subplaten; and wherein said means for closing and opening said mold halves is operably attached to said first and second subplatens.

5. Apparatus according to claim 1 wherein said mold halves have at least three rows of cavities side by side and a manifold arrangement for maintaining communication between the outside and interior of all of said cavities.

6. Apparatus according to claim 1 wherein said heating means comprises a first outer heater above a central heater, and a second outer heater below said central heater, said first mold half being disposed above said second mold half.

7. Apparatus according to claim 6 wherein said first conveyer chain supports edges of said first sheet above a parting line of said mold halves a distance which is greater than a distance below the parting line of said mold halves at which said second conveyor chain supports edges of said second sheet.

* * * * *